Sept. 19, 1972 V. M. CANNULI 3,692,594
METHOD OF FORMING AN EPITAXIAL SEMICONDUCTIVE LAYER WITH A SMOOTH SURFACE
Filed June 21, 1971
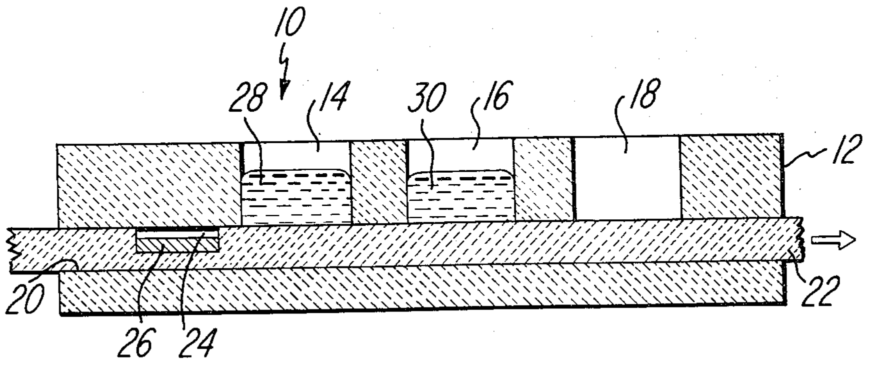
INVENTOR.
Vincent M. Cannuli
BY
Donald S. Cohen
ATTORNEY United States Patent Office 3,692,594
Patented Sept. 19, 1972

3,692,594
METHOD OF FORMING AN EPITAXIAL SEMICONDUCTIVE LAYER WITH A SMOOTH SURFACE
Vincent Michael Cannuli, Trenton, N.J., assignor to RCA Corporation
Filed June 21, 1971, Ser. No. 154,824
Int. Cl. H01l 7/38
U.S. Cl. 148—172 9 Claims

ABSTRACT OF THE DISCLOSURE

An epitaxial semiconductive layer having a smooth surface is formed on a substrate by first depositing the epitaxial layer on the substrate from a first solution of the semiconductive material dissolved in a molten metal solvent and then bringing the epitaxial layer having a film of the first solution thereon into contact with a second solution of a molten metal solvent saturated with a semiconductive material and containing a metal which increases the surface cohesion of the solution. The epitaxial layer is held in contact with the second solution only long enough to dissolve the film of the first solution in the second solution. The substrate is then removed from the second solution without retaining any of the second solution on the surface of the epitaxial layer so as to provide the epitaxial layer with a smooth surface.

BACKGROUND OF THE INVENTION

The invention herein disclosed was made in the course of or under a contract or subcontract thereunder with the Department of the Army.

This invention relates to a method of forming an epitaxial semiconductive layer with a smooth surface, and more particularly to a method of forming an epitaxial layer of a Group III–V semiconductive material from the liquid phase with the layer having a smooth surface.

Epitaxial layers of single crystalline semiconductive material have been deposited on a crystalline substrate by flooding a surface of the substrate with a solution of a semiconductive material dissolved in a molten metal solvent; cooling the solution so that a portion of the dissolved semiconductive material precipitates and deposits on the substrate as an epitaxial layer, and then decanting the remainder of the solution. This method is known as solution growth or liquid phase epitaxy. For a detailed description, see H. Nelson, "Epitaxial Growth from the Liquid State and its Application to the Fabrication of Tunnel and Laser Diodes," RCA Review; No. 24, p. 603, 1963. Liquid phase epitaxy has been particularly useful for depositing epitaxial layers of the group III–V compound semiconductive materials, such as the nitrides, phosphides, arsenides and antimonides of boron, aluminum, gallium and indium and mixtures and combinations thereof. The solution from which the epitaxial layer is deposited can contain a conductivity modifier so as to provide an epitaxial layer of a desired conductivity type. Also, successive layers can be deposited by liquid phase epitaxy with the layers being of opposite conductivity type so as to provide a PN junction between the layers.

U.S. Pat. No. 3,565,702 to H. Nelson, issued Feb. 23, 1971, entitled "Depositing Successive Epitaxial Semiconductive Layers from the Liquid Phase," describes a method and apparatus for depositing either a single epitaxial layer or a plurality of epitaxial layers in succession by liquid phase epitaxy. The apparatus includes a refractory furnace boat having a plurality of wells in a surface thereof and a movable slide in a passage which extends across the bottom surfaces of the wells. In the use of this apparatus, a solution of the semiconductive material in a molten metal solvent is provided in one of the wells of the furnace boat and the substrate is seated in a slot or recess in the slide. When the solution is at the proper temperature, the slide is moved to bring the substrate into the well so that the solution contacts the surface of the substrate. The solution is then cooled so as to deposit the expitaxial layer on the substrate. When an epitaxial layer of the desired thickness is so deposited, the slide is moved to remove the substrate from the well. If two successive epitaxial layers are desired, separate solutions are provided in two adjacent wells of the furnace boat. After the first epitaxial layer is deposited on the substrate in the first well, the slide is moved to bring the substrate into the second well so that the second solution contacts the surface of the first epitaxial layer. Further cooling deposits the second epitaxial layer on the first epitaxial layer. The slide is then moved to remove the substrate from the second well.

Although the method and apparatus described in Pat. No. 3,565,702 is quite satisfactory for depositing epitaxial layers by liquid phase epitaxy, it has been found to have a disadvantage when the device being formed requires a smooth surface on the last epitaxial layer deposited. In this method, when the substrate is removed from a well after the epitaxial layer is deposited, some of the solution in the well is carried along on the surface of the epitaxial layer. The solution carried off on the surface of the last epitaxial layer tends to deposit additional amounts of the semiconductive material on the last epitaxial layer in a manner such that the surface of the last epitaxial layer is not smooth. Attempts to mechanically wipe off this excess solution have not proven satisfactory since it is difficult to consistently scrape off the solution from the entire surface of the epitaxial layer so as to provide a smooth surface. Therefore to achieve a smooth surface it has been necessary to polish the surface either mechanically or chemically. However, such polishing of the surface not only adds another operation to the making of the device, but also reduces the thickness of the epitaxial layer. When the epitaxial layer is very thin, such as 1 to 2 microns in thickness, any reduction in thickness is undesirable.

SUMMARY OF THE INVENTION

An epitaxial layer of a crystalline semiconductive material having a smooth surface is formed on a substrate by bringing the substrate into contact with a first solution containing a semiconductive material dissolved in a molten metal solvent. The first solution is cooled sufficiently to deposit an epitaxial layer of the semiconductive material on the surface of the substrate. While the surface of the epitaxial layer is still covered with a liquid film of the first solution the epitaxial layer is brought into contact with a second solution containing a molten metal solvent in which is dissolved a semiconductor material and a metal which increases the surface cohesion of the second solution. The substrate, with the epitaxial layer, is then removed from the second solution without retaining any of the second solution on the epitaxial layer.

BRIEF DESCRIPTION OF THE DRAWING

The figure of the drawing is a cross-sectional view of an apparatus for carrying out the method of the present invention.

DETAILED DESCRIPTION

Referring to the drawing, an apparatus suitable for carrying out the method of the present invention is generally designated as 10. The apparatus 10 comprises a refractory furnace boat 12 of an inert material, such as graphite. The boat 12 has three, spaced wells 14, 16 and 18 in its upper surface. A passage 20 extends longitudinally through the boat 12 from one end to the other end and extends across the bottoms of the wells 14, 16 and 18. A slide 22 of a refractory material, such as graphite, movably extends through the passage 20 so that the top surface of the slide forms the bottom surface of the wells 14, 16 and 18. The slide 22 has a recess 24 in its upper surface which is adapted to receive a flat substrate 26 on which the expitaxial layer or layers are to be deposited. The recess 24 is large enough to allow the substrate 26 to lie flat therein and is deeper than the thickness of the substrate so that the upper surface of the substrate is below the top of the recess.

To carry out the method of the present invention, a first charge is placed in the well 14 and a second charge placed in the well 16. The first charge consists of a mixture of the semiconductive material of the epitaxial layer to be deposited, a metal solvent for the semiconductive material and, if the epitaxial layer is to be of a particular conductivity type, a conductivity modifier. For example, to deposit an epitaxial layer of gallium arsenide, the semiconductive material would be gallium arsenide, the metal solvent would be gallium, and the conductivity modifiers could be either tellurium, tin or silicon for an N type layer or zinc, germanium, or magnesium for a P type layer. The ingredients would be present in the mixture in granulated solid form at room temperature. The second charge consists of a semiconductive material, a metal solvent for the semiconductive material, and a metal which will increase the surface adhesion of the solution formed when the second charge is melted. For example, the semiconductive material could be gallium arsenide, the metal solvent could be gallium and the metal for providing the high viscosity could be aluminum or tin. In the second charge. the amount of the semiconductive material should be great enough to completely saturate the solvent when the charge is melted and is at the operating temperature as will be explained. A substrate 26 is placed in the recess 24 in the slide 22. The substrate 26 may be of any material on which an epitaxial layer of the desired semiconductive material may be deposited. For example, a substrate of single crystalline gallium arsenide may be used for depositing an epitaxial layer of gallium arsenide.

The loaded furnace boat 12 is then placed in a furnace tube (not shown) and a flow of high purity hydrogen is provided through the furnace tube and over the furnace boat 12. The temperature of the furnace tube is increased so as to heat the contents of the furnace boat to a temperature above the melting temperature of the ingredients of the charges, generally between 800° C. to 950° C. This temperature is maintained long enough to insure complete melting and mixing of the ingredients of each of the melts. Thus, the first charge becomes a first solution 28 of the semiconductive material and the conductivity modifier dissolved in the molten metal solvent, and the second charge becomes a second solution 30 of semiconductive material and the metal dissolved in the molten metal solvent.

The temperature of the furnace tube is then reduced in order to cool the furnace boat 12 and its contents. The slide 22 is moved in the direction of the arrow until the substrate 26 is within and becomes the bottom of the well 14. This brings the upper surface of the substrate 26 into contact with the first solution 28. Continued cooling of the furnace boat 12 and its contents causes some of the semiconductive material in the first solution 28 to precipitate and deposit on the surface of the substrate 26 to form the epitaxial layer. During the deposition of the semiconductive material some of the conductivity modifier in the solution 28 becomes incorporated in the lattice of the epitaxial layer to provide the epitaxial layer with a desired conductivity type.

When an epitaxial layer of the desired thickness is deposited on the substrate 26, the slide 22 is again moved in the direction of the arrow to carry the substrate from the first well 14 into the second well 16 where the surface of the epitaxial layer is brought into contact with the second solution 30. The temperature of the second solution 30 at the time that the substrate 26 is moved into the second well 16 is the operating temperature of the second solution 30 previously referred to. It is at this temperature that there must be sufficient semiconductive material in the second solution 30 to completely saturate the metal solvent. When the substrate 26 is moved from the first well 14, a thin film of the first solution 28 is generally retained on the surface of the epitaxial layer and is carried with the substrate to the second well 16. When the substrate 26 reaches the second well 16, the thin film of the first solution on the surface of the epitaxial layer promptly dissolves in the second solution 30. The substrate 26 is retained in the second well 16 just long enough for the film of the first solution to dissolve in the second solution 30, which is a few seconds, but not long enough to allow any of the semiconductor material in the second solution 30 to precipitate and deposit on the epitaxial layer. The slide 22 is then again moved in the direction of the arrow to carry the substrate 26 out of the second well 16 and into the third well 18. When the substrate 26 is moved out of the second well 16, the high surface cohesion of the second solution 30 results in the second solution being entirely retained in the second well so that in essence all of the second solution is scraped off of the epitaxial layer. Thus, when the substrate reaches the third well 18, the surface of the epitaxial layer is free of any solution which could deposit additional semiconductive material on the epitaxial layer to roughen the surface so as to provide a smooth surface which requires no polishing.

Although the method of the present invention has been described with regard to depositing a single epitaxial layer on the substrate, it can be used to deposit successive epitaxial layers with the last epitaxial layer having a smooth surface. To deposit a plurality of successive epitaxial layers on a substrate by the method of the present invention, the furnace boat 12 is provided with additional wells so that there is a separate well for each solution from which each epitaxial layer is deposited. The substrate 26 is carried by the slide 22 to each of the wells successively where each of the epitaxial layer is deposited. After the final epitaxial layer is deposited, the substrate is carried into the well containing the solution having the high surface cohesion and which is saturated with the semiconductive material so as to dissolve off any solution remaining on the surface of the last epitaxial layer deposited. The substrate is then quickly removed from this last solution so as to provide the last epitaxial layer with a smooth surface. Thus, there is provided by the present invention a method of forming one or more epitaxial layers of a semiconductive material on a substrate by liquid phase epitaxy with the last epitaxial layer having a smooth surface which does not require any polishing.

I claim:

1. A method of forming on a substrate an epitaxial layer of a crystalline semiconductor material having a smooth surface comprising the steps of:

bringing a surface of the substrate into contact with a first solution containing a semiconductive material dissolved in a molten metallic solvent, cooling said first solution sufficiently to deposit an epitaxial layer of the semiconductive material on said surface of the substrate, while the surface of the epitaxial layer is still covered with a liquid film of said first solution, bringing said epitaxial layer into contact with a second solution containing a molten metallic solvent in which is dissolved a semiconductor material and an additional metal which increases the surface cohesion of the second solution and removing the substrate and epitaxial layer from the second solution without retaining any of the second solution on said epitaxial layer.

2. The method of claim 1 in which the epitaxial layer is retained in contact with the second solution for a period of time just long enough to dissolve the liquid film of the first solution into the second solution but not long enough to deposit any of the semiconductive material in said second solution onto the epitaxial layer.

3. The method of claim 2 in which the epitaxial layer is retained in contact with the second solution for a few seconds.

4. The method of claim 2 in which the second solution is saturated with the semiconductive material at the temperature that the epitaxial layer is brought into contact with the second solution.

5. The method of claim 4 in which each of the solutions is a group III–V compound semiconductive material dissolved in a group III element metal.

6. The method of claim 5 in which the additional metal in the second solution is either aluminum or tin.

7. A method of forming on a substrate an epitaxial layer of a crystalline semiconductive material having a smooth surface comprising:

providing in a first well in a furnace boat of a refractory material a first solution of a semiconductive material dissolved in a molten metal solvent, providing in a second well of said furnace boat a second solution of a molten metal solvent having dissolved therein a semiconductor material and an additional metal which increases the surface cohesion of the second solution, mounting a substrate on a slide which is movable through said furnace boat and across the bottoms of said wells, moving said slide so as to bring said substrate into first well with a surface of said substrate contacting the first solution, cooling said first solution sufficiently to deposit an epitaxial layer of the semiconductive material from said first solution on said surface of the substrate, moving said slide so as to carry said substrate with a liquid film of said first solution on the epitaxial layer from said first well to said second well so that the epitaxial layer is brought into contact with said second solution, after the substrate is into said second well just long enough for the liquid film of said first solution to dissolve into said second solution, moving said slide to carry said substrate out of the second well without retaining any of the second solution on the epitaxial layer.

8. The method of claim 7 wherein the substrate is retained in said second well for a few seconds.

9. The method of claim 7 wherein the second solution is saturated with the semiconductive material at the temperature that the substrate is moved into the second well.

References Cited

UNITED STATES PATENTS

| | | | |
|---|---|---|---|
| 3,429,756 | 2/1969 | Groves | 148—1.6 X |
| 3,537,029 | 10/1970 | Kressel et al. | |
| 3,565,702 | 2/1971 | Nelson | 148—172 |

GEORGE T. OZAKI, Primary Exmainer

U.S. Cl. X.R.

148—171; 117—201; 252—62.3 GA